United States Patent [19]
Breese

[11] Patent Number: 6,015,350
[45] Date of Patent: Jan. 18, 2000

[54] COLLAPSIBLE VEHICLE DRIVESHAFT

[75] Inventor: Douglas E. Breese, Northwood, Ohio

[73] Assignee: Dana Corporation, Toledo, Ohio

[21] Appl. No.: 08/984,212

[22] Filed: Dec. 3, 1997

[51] Int. Cl.[7] ........................................... F16C 3/03
[52] U.S. Cl. .......................... 464/162; 74/492; 280/777; 464/183
[58] Field of Search ..................... 464/113, 162, 464/179, 181, 183, 901; 403/359.6, 359.9, 375; 74/492; 280/777

[56] References Cited

U.S. PATENT DOCUMENTS

| | | | |
|---|---|---|---|
| 2,199,926 | 5/1940 | Swennes . | |
| 3,293,884 | 12/1966 | Grob . | |
| 4,125,000 | 11/1978 | Grob . | |
| 4,177,654 | 12/1979 | Aucktor | 464/906 |
| 4,572,022 | 2/1986 | Mettler | 74/492 |
| 4,622,022 | 11/1986 | Diffenderfer et al. | 464/162 |
| 4,738,154 | 4/1988 | Hancock | 74/492 |
| 4,991,871 | 2/1991 | Sadakata | 280/777 |
| 5,235,734 | 8/1993 | DuRocher et al. | 74/492 |
| 5,314,204 | 5/1994 | DuRocher et al. | 280/777 |
| 5,538,474 | 7/1996 | Kretschmer et al. | 464/162 |
| 5,830,071 | 11/1998 | Castellon | 464/162 |

*Primary Examiner*—Eileen Dunn Lillis
*Attorney, Agent, or Firm*—MacMillan, Sobanski & Todd, LLC

[57] ABSTRACT

A telescoping driveshaft assembly that has a relatively low collapse force rating and that does not have a reduced torque carrying capacity includes an inner tube that is received within an outer tube in a press fit relationship. The inner tube is disposed within the outer tube such that a predetermined amount of overlap is formed between the two tubes. A mechanical interlock is formed in the overlapped region for increasing the total frictional force between the inner tube and the outer tube as well as for increasing the torque carrying capacity of the driveshaft tube. The mechanical interlock can be formed using one or more crimps which are disposed in the overlapped region. The length of the overlapped region, the number of crimps and the crimp configuration are a function of a number of factors including the torque requirements of the driveshaft tube, the sizes of the inner tube and the outer tube, and the material chosen for the driveshaft tube. Preferably, the crimps extend around the entire perimeter of the overlapped region in a spaced-apart fashion. The crimps can be formed having any shape and length. Preferably, the crimps have an elongated, generally oval shape and a length which is less than about one-third the total length of the overlapped region.

11 Claims, 6 Drawing Sheets

COLLAPSIBLE VEHICLE DRIVESHAFT

BACKGROUND OF THE INVENTION

This invention relates to a vehicle driveshafts, and in particular to a collapsible vehicle driveshaft tube.

Torque transmitting shafts are widely used for transferring rotational power between a source of rotational power and a rotatably driven mechanism. An example of a torque transmitting shaft is a driveshaft tube used in a vehicle driveshaft assembly. The driveshaft assembly transmits rotational power from a source, such as an engine, to a driven component, such as a pair of wheels. A typical vehicle driveshaft assembly includes a hollow cylindrical driveshaft tube having an end fitting secured to each end thereof. Usually, the end fittings are embodied as end yokes which are adapted to cooperate with respective universal joints. For example, a driveshaft assembly of this general type is often used to provide a rotatable driving connection between the output shaft of a vehicle transmission and an input shaft of an axle assembly for rotatably driving the vehicle wheels.

A recent trend in passenger, sport utility and pickup truck vehicle design has been to design and manufacture various components of the vehicle such that they will absorb energy during a front end impact. Each vehicle component in the line of force from a front end impact of the vehicle with another object is designed to absorb a certain percentage of the total energy. By allocating the energy absorption among a number of vehicle components, a more controlled collapse of the vehicle occurs, thereby resulting in increased safety to the occupants of the vehicle.

The vehicle driveshaft assembly is one of the many components which are being used to absorb energy during a front end impact. In the past, driveshaft tubes have been formed having a collapsible design which is adapted to cause the driveshaft tube to collapse when a sufficiently large axial force is applied to the tube. These known collapsible designs include forming a swaged (i.e. a reduced diameter) or a bumped section in the driveshaft tube. Ideally, the force required to collapse the driveshaft tube is designed to be only as large as it needs to be, i.e. large enough to provide a margin of safety above the force values applied to the driveshaft during normal operating conditions. Typically, the axial forces required to collapse the swaged or bumped driveshaft tubes designs have been significantly higher than the desired values. In addition, the swaged tube design results in lower torque carrying capacity due to the reduced diameter of the tube. Ideally, it would be desirable to provide a collapsible driveshaft tube which can provide sufficient torque carrying capacity and which collapses under axial forces which are only as high as needed.

SUMMARY OF THE INVENTION

This invention relates to a telescoping driveshaft assembly having a relatively low collapse force rating and which does not have a reduced torque carrying capacity. In accordance with this invention, the driveshaft tube includes an inner tube which is received within an outer tube in a press fit relationship. The inner tube is disposed within the outer tube such that a predetermined amount of overlap is formed between the two tubes. A mechanical interlock is formed in the overlapped region for increasing the total frictional force between the inner tube and the outer tube as well as for increasing the torque carrying capacity of the driveshaft tube. The mechanical interlock can be formed using one or more crimps which are disposed in the overlapped region. The length of the overlapped region, the number of crimps and the crimp configuration are a function of a number of factors including the torque requirements of the driveshaft tube, the sizes of the inner tube and the outer tube, and the material chosen for the driveshaft tube. Preferably, the crimps extend around the entire perimeter of the overlapped region in a spaced-apart fashion. The crimps can be formed having any shape and length. Preferably, the crimps have an elongated, generally oval shape and a length which is less than about one-third the total length of the overlapped region.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
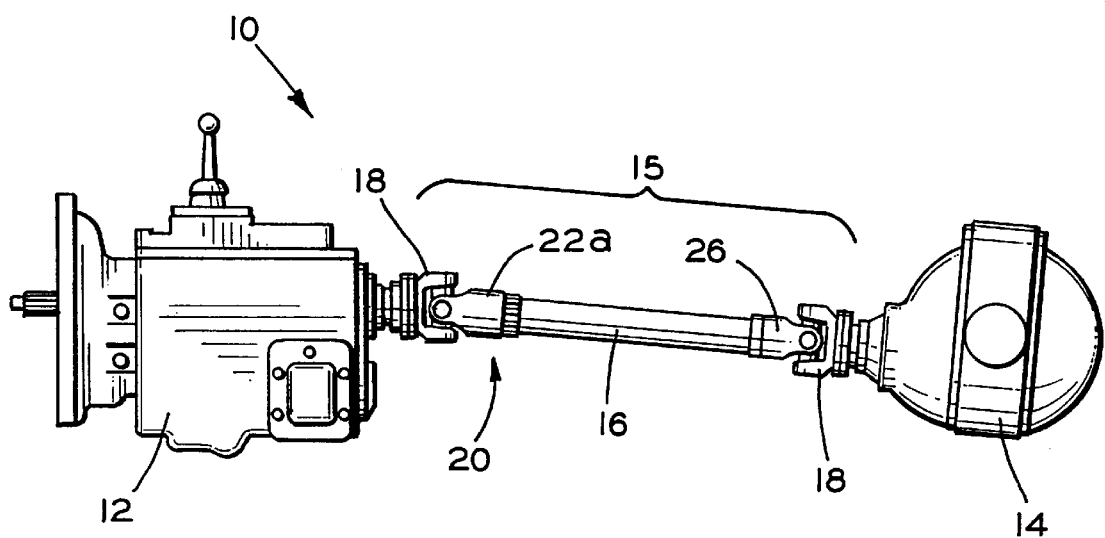
FIG. 1 is a schematic view in elevation of a prior art vehicle drive train assembly.

Referring now to the drawings, there is illustrated in FIG. 1 a vehicle drive train, indicated generally at 10. The drive train 10 includes a transmission 12 connected to axle assembly 14 through a driveshaft assembly 15. The driveshaft assembly 15 includes an elongated, cylindrically-shaped driveshaft tube 16. As is typical in vehicle drive trains 10, the transmission output shaft, not shown, and the axle assembly input shaft, not shown, are not co-axially aligned. Therefore, universal joints 18 are positioned at each end 20 of the driveshaft tube 16 to rotatably connect the driveshaft tube 16 at an angle to the transmission output shaft and the axle assembly input shaft. The connection between the ends 20 of the driveshaft tube 16 and the universal joints 18 is usually accomplished by an end fitting 22, such as a tube yoke or a slip yoke.

The ends 20 of the driveshaft tube 16 are open and are adapted for receiving the end fitting 22. Typically, each end fitting 22 includes a tube seat (not shown) which is adapted to be inserted into an open end 20 of the driveshaft tube 16. Accordingly, the tube seat enables torque to be transmitted between the driveshaft tube 16 and the end fitting 22. Typically, the end fitting 22 is secured to the driveshaft tube 16 by a weld or another relatively permanent attachment method.

Figure 2:
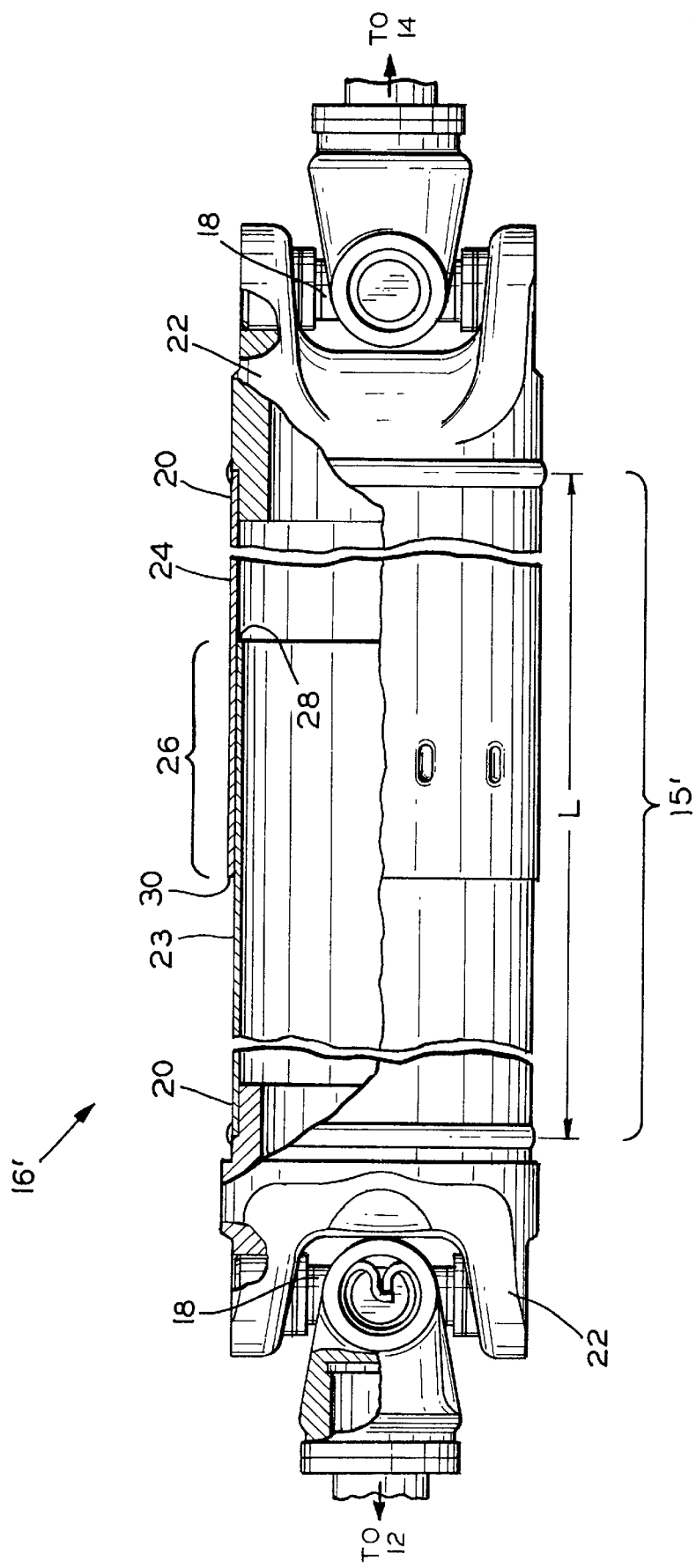
FIG. 2 is a side view, partially in cross section, of a first embodiment of a vehicle driveshaft assembly in accordance with this invention.

FIG. 2 illustrates a vehicle driveshaft assembly 15' in accordance with this invention. In the illustrated embodiment, like components from FIG. 1 are denoted using the same number while components which differ from FIG. 1 are denoted by an apostrophe following the number. As shown therein, the driveshaft tube 16' is a hollow cylindrical member having an inner tube 23 that is received within an outer tube 24 in an overlapping or telescoping manner. In the illustrated embodiment, the outer tube 24 is secured to the rear universal joint 18 (i.e. adjacent the axle 14) and the inner tube 23 is secured to the forward universal joint 18 (i.e. adjacent the transmission 12), although such is not necessary. For example, the outer tube 24 may be secured to the universal joint 18 adjacent the transmission 12 while the inner tube 23 is secured to the universal joint adjacent the axle 14. (See FIG. 5, as described below.)

The driveshaft tube 16' has a relatively long, narrow shape and an axial length L defamed by the distance between the two ends 20. The overall length L of the driveshaft tube 16' is dependent on the type of vehicle in which it is used. For example, in passenger cars, the overall length L of the driveshaft tube 16' is in the range of about thirty to fifty inches while the overall length L of a driveshaft tube 16' as used in a pickup truck or sport utility vehicle is typically in the range of about sixty to eighty inches. Each of the inner tube 22 and the outer tube 24 extends for a portion of the total axial length L, with a portion of the outer tube 24 and a portion of the inner tube 24 defining an overlapped region 26.

In the illustrated embodiment, the overlapped region 26 of the inner tube 23 and the outer tube 24 is located closer to the rear universal joint 18 (i.e. adjacent the axle 14), although such is not necessary. Generally, the inner tube 22 and the outer tube 24 are configured such that the location of the overlapped region 26 is at a position along the length of the driveshaft tube 16' where the desired amount of collapsible axial length will be provided. As shown in FIG. 2, the amount of collapsible axial length is defined by the distance between the overlapping end 28 of the inner tube 23 and its adjacent end fitting 22 or the distance between the overlapping end 30 of the outer tube 24 and its adjacent end fitting 22.

The driveshaft tube 16' can be formed from any suitable material. Typically, the driveshaft tube 16' is formed from steel or an aluminum alloy. Other materials, such as fiber reinforced composites or other combinations of metallic or non-metallic materials, may also be used. Preferably, the driveshaft tube 16' is formed from an aluminum alloy. Suitable methods for forming the driveshaft tube 16 are well known to persons skilled in the art. The driveshaft tube 16' can also be formed having a larger diameter center portion, an end portion having a reduced diameter, and a diameter reducing portion positioned between the center and end portions. This type of driveshaft tube is more fully described in assignee's commonly owned U.S. Pat. Nos. 5,637,042 and 5,643,093 and the entireties of which are both incorporated herein by reference.

Figure 3:
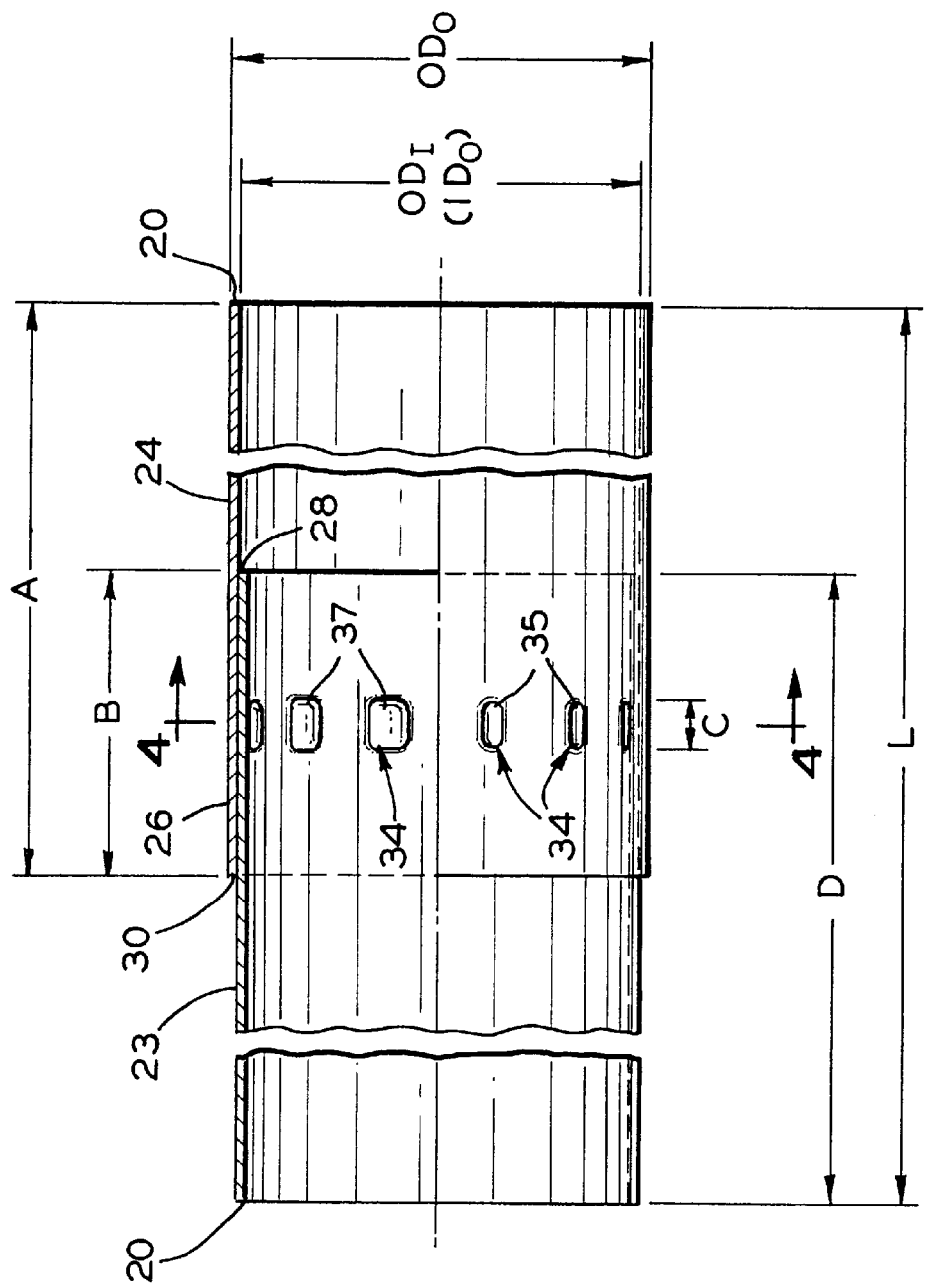
FIG. 3 is a detailed side view, partially in cross section, of the vehicle driveshaft assembly shown in FIG. 2.
Figure 4:
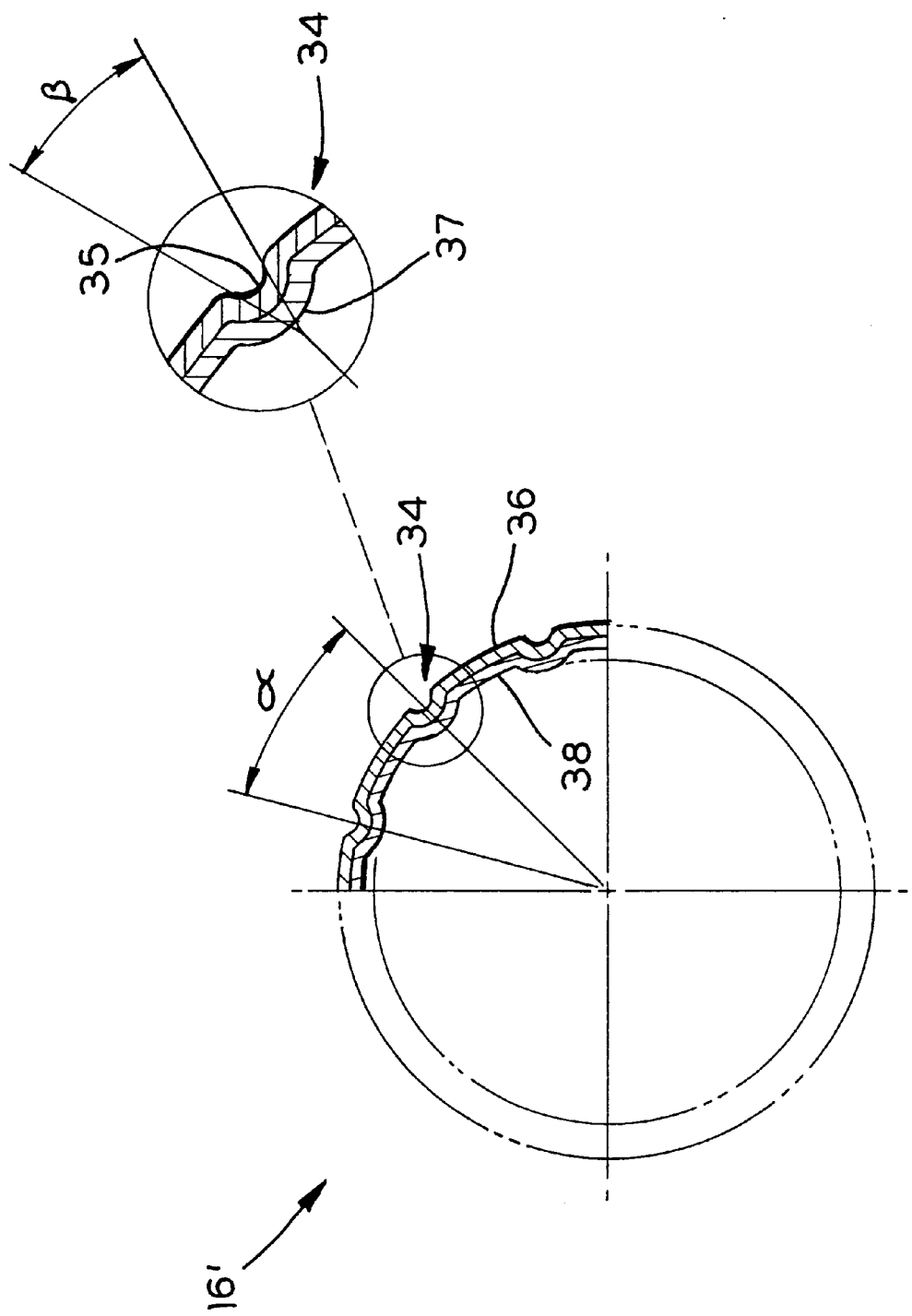
FIG. 4 is a cross sectional view of the driveshaft shown in FIG. 3 taken along line 4—4.

FIGS. 3 and 4 illustrate additional details of the driveshaft tube 16' as shown in FIG. 2. Preferably, the inner tube 22 is disposed within the outer tube 24 in a press fit relationship. Typically, the outer diameter $OD_I$ of the inner tube 23 is only slightly smaller than the inner diameter $ID_O$ of the outer tube 24 in a press fit relationship, such that a frictional force exists between the two tubes. In this manner, axial movement between the inner tube 23 and the outer tube 24 is precluded until an axial force greater than the frictional force is applied at one of the ends of the driveshaft tube 16'.

In the illustrated embodiment, the driveshaft tube 16' has an overall length of L, the outer tube 24 has a length of A, the inner tube 23 has a length of D, and the overlapped region 26 has a length of B. As noted previously, the overall length L of the driveshaft tube 16' is a function of the type of vehicle in which it is used and typically ranges between thirty to eighty inches. Preferably, one of the inner tube 23 or the outer tube 24 is configured to be shorter than the other tube, although such is not necessary. In the illustrated embodiment, the outer tube 24 has a length A of about fifteen inches. The inner tube 23 has a length D which is equal to "L−A+B". Accordingly, if the overall length L of the driveshaft tube is about thirty-two inches and the overlapped region 26 has a length B of about three inches, the inner tube 23 has a length D of about twenty inches. Generally, the overlapped region 26 may be configured to have any length B. Preferably, the overlapped region 26 has a length B in the range of about two to ten inches. More preferably, the overlapped region 26 has a length of about three inches.

The inner tube 23 and the outer tube 24 are further secured together using a mechanical interlock. In the illustrated embodiment, this mechanical interlock is formed by plurality of discrete crimps 34 located within the overlapped region 26. As shown in FIG. 3, the crimps 34 have an overall axial length of C. Preferably, the crimps 34 are formed in the center of the overlapped region 26 as shown in FIG. 3, although such is not necessary. Generally, the crimps 34 may be configured to have any length C. Preferably, the length C of the crimps 34 is about one-eighth to one-third of the length B of the overlapped region 26. In the embodiment illustrated in FIG. 3, the length C of the crimps 34 is about one-half inch and the length B of the overlapped region 26 is about three inches.

As shown in FIG. 4, each crimp 34 includes a depression 35 which is formed in the outer surface 36 of the outer tube 24 and a raised protrusion 37 on the inner surface 38 of the inner tube 23. The depression 35 and its corresponding protrusion 37 may be formed to have any shape. For example, in the embodiment shown in FIGS. 3 and 4, each depression 35/protrusion 37 has a generally elongated oval shape. As shown in the detailed inset to FIG. 4, the axial walls of the depression 35 may extend at an angle β with respect to each other.

The crimps 34 may extend around the entire perimeter of the overlapped region 26 as shown in FIGS. 3 and 4, or around only a portion thereof. Preferably, the crimps 34 are formed around the entire perimeter of the overlapped region 26. The number and configuration of the crimps 34 may vary depending on a number of factors including the torque requirements of the driveshaft tube 16', the sizes of the inner tube 23 and the outer tube 24, or the material chosen for the driveshaft tube 16'. For example, any number of crimps 34 may be spaced apart at an angle α around the entire perimeter of the overlapped region or a portion thereof. In the embodiment shown in FIGS. 3 and 4, twelve crimps 34 are equidistantly spaced apart from one another an angle α of approximately thirty degrees about the entire perimeter of the overlapped region 26, and the walls of each of the crimps 34 extend at an angle β of approximately thirty degrees.

Figure 5:
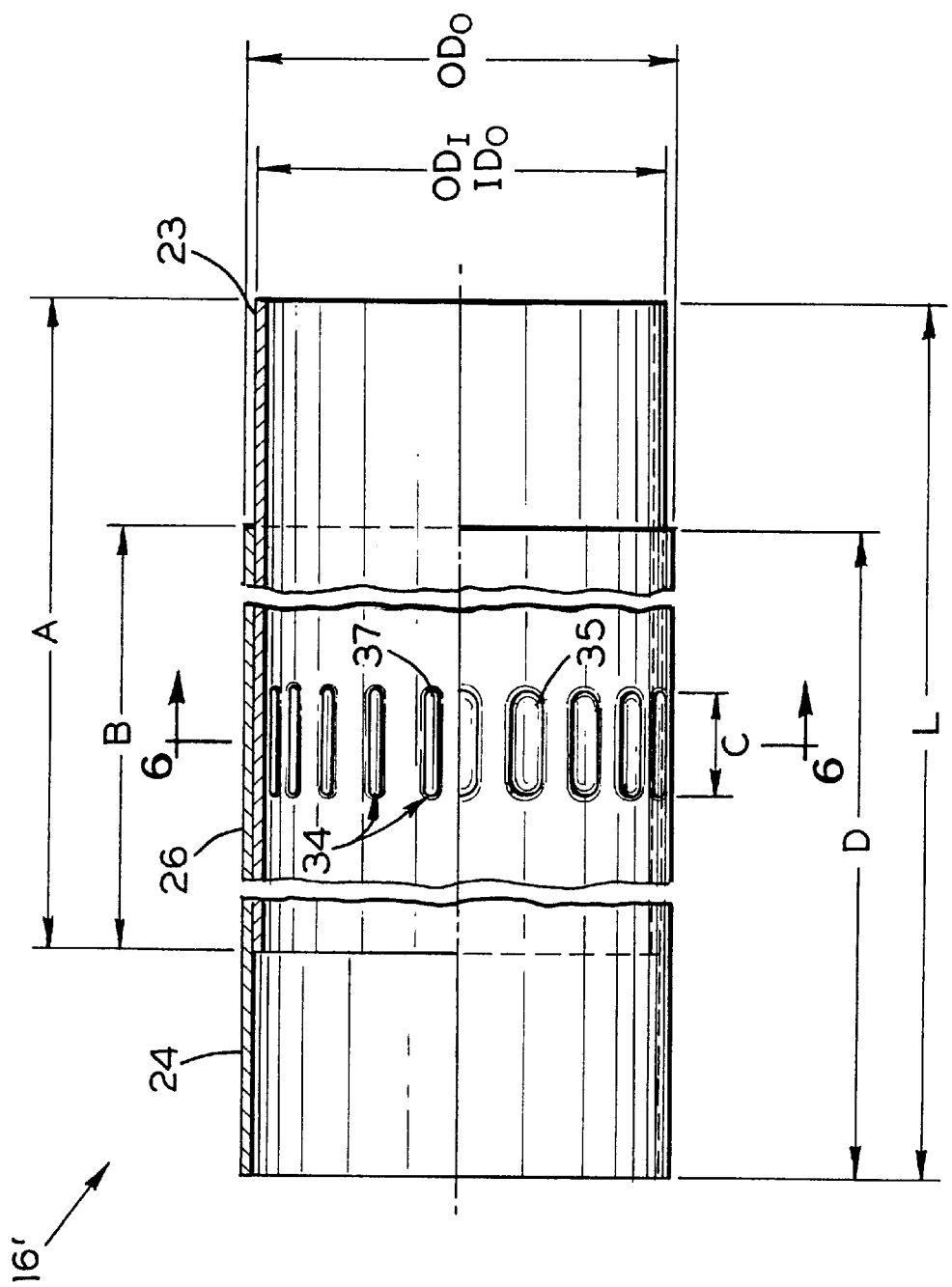
FIG. 5 is a detailed side view, partially in cross section, of a second embodiment of a vehicle driveshaft assembly in accordance with this invention.
Figure 6:
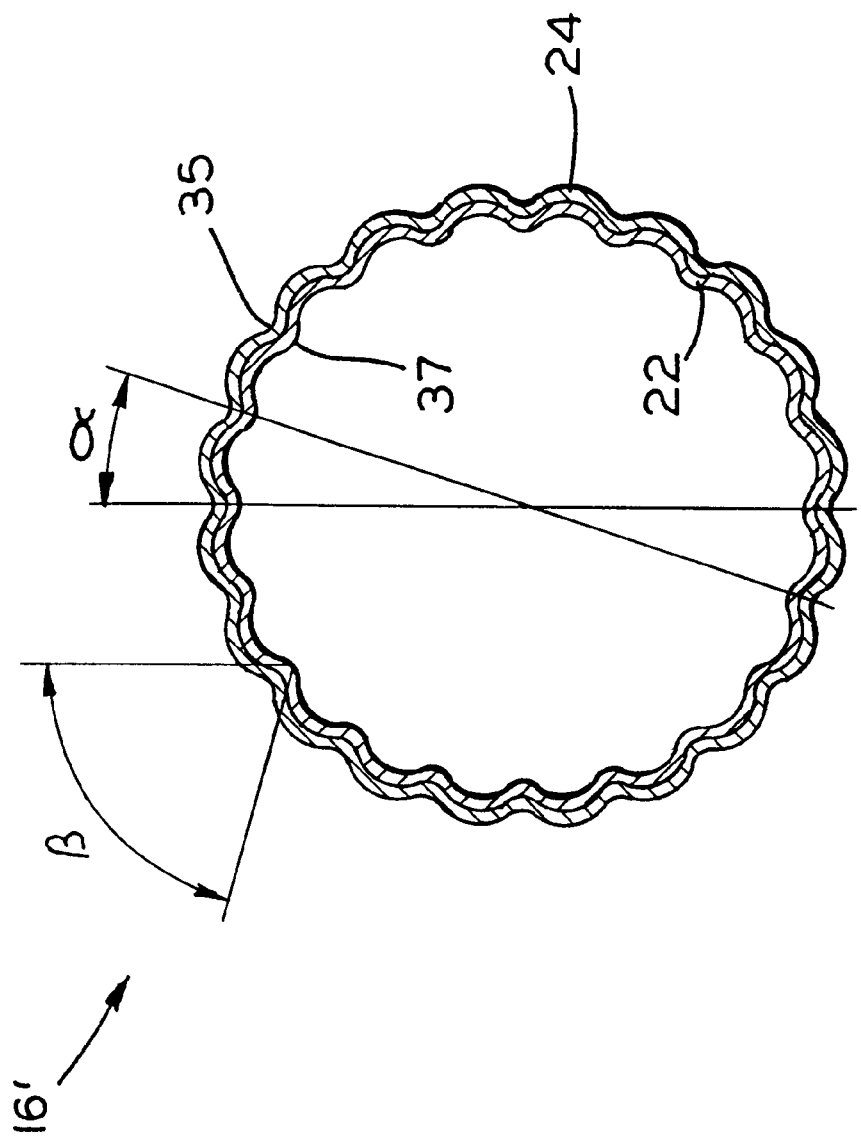
FIG. 6 is a cross sectional view of the driveshaft shown in FIG. 5 taken along is line 6—6.

A second embodiment of a driveshaft tube 16' in accordance with this invention is illustrated in FIGS. 5 and 6. In this second embodiment, the outer tube 24 is secured to the forward end fitting 22 (adjacent the transmission 12) while the inner tube 23 is secured to the rear end fitting 22 (adjacent the axle 14). As further shown therein, the length B of the overlapped region 26 and the length C of the crimps 34 are both longer. As illustrated, the length of the overlapped region 26 is about five inches while the length of each crimp 34 is about one inch. In addition, twenty crimps 34 extends continuously (or essentially continuously) about the entire perimeter of the overlapped region. In the embodiment shown in FIG. 5, twenty crimps 34 are equidistantly spaced apart from one another an angle α of approximately eighteen degrees about the entire perimeter of the overlapped region 26. The walls of each of the crimps 34 can extend at an angle β of approximately thirty degrees as in the previous embodiment or at any other desired angle.

In operation, the crimps 34 form a mechanical interlock between the inner tube 23 and the outer tube 24 that increases the frictional force between the two tubes, as well as increases the overall torque carrying capacity of the driveshaft tube 16'. When an axial force which is greater than the total frictional force between the two tubes is applied to one of the ends 20 of the telescoping driveshaft 16', the inner tube 23 is forced to move axially within the outer tube 24. Accordingly, the overall length of the driveshaft tube 16' collapses or shortens, thereby absorbing energy during this process. Typically, these large axial forces are generated during a front end impact of the vehicle with another object.

Generally, it is desirable to keep the value of the force which causes collapse of the driveshaft tube 16' as low as possible, i.e. at a value which is greater than the axial forces applied during normal vehicle operation plus an amount provided as a safety margin. The known designs of collapsible driveshaft tubes designs (i.e. those having swaged or bumped regions) require axial forces ranging between about twenty seven thousand pounds to about thirty seven thousand pounds to collapse. In comparison, the axial force required to collapse the telescoping driveshaft tube 16' of this invention are about one-half to about one-third of the prior art values, or about ten thousand pounds to about twenty thousand pounds. As such, the collapsible, telescopic driveshaft tube 16' of this invention will collapse under lower axial forces, thereby absorbing these axial forces and better protecting the occupants of the vehicle.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft assembly comprising:

an inner member having an end;

an outer tube having an end that is disposed about said end of said inner member so as to define an overlapped region; and at least one crimp formed in said inner member and said outer tube to prevent relative axial and rotational movement between said inner member and said outer tube without deformation of either of said inner member and said outer tube and to allow relative axial movement between said inner member and said outer tube with deformation of either or both of said inner member and said outer tube.

2. The driveshaft assembly defined in claim 1 wherein said inner member is a hollow tube.

3. The driveshaft assembly defined in claim 1 wherein said inner member is press fit within said outer tube.

4. The driveshaft assembly defined in claim 1 wherein said overlapped region defines an axial length, and wherein said at least one crimp extends axially approximately one-eighth to approximately one-third of said axial length of said overlapped region.

5. The driveshaft assembly defined in claim 1 wherein said at least one crimp includes a pair of axially extending walls that define an angle of approximately thirty degrees therebetween.

6. The driveshaft assembly defined in claim 1 wherein said at least one crimp is a plurality of crimps formed in said inner member and said outer tube.

7. The driveshaft assembly defined in claim 6 wherein said plurality of crimps are equidistantly spaced circumferentially about said overlapped region.

8. The driveshaft assembly defined in claim 7 wherein said overlapped region defines an axial length, and wherein said crimps extend axially approximately one-eighth to approximately one-third of said axial length of said overlapped region.

9. The driveshaft assembly defined in claim 7 wherein each of said crimps includes a pair of axially extending walls that define an angle of approximately thirty degrees therebetween.

10. The driveshaft assembly defined in claim 6 wherein said crimps are formed circumferentially discretely about said overlapped region.

11. The driveshaft assembly defined in claim 6 wherein said crimps are formed circumferentially continuously about said overlapped region.

* * * * *